United States Patent
Kwon

(10) Patent No.: US 7,111,388 B2
(45) Date of Patent: Sep. 26, 2006

(54) APPARATUS FOR PRESS-FITTING A BEARING CAP INTO A CYLINDER BLOCK

(75) Inventor: O Kwang Kwon, Ulsan (KR)

(73) Assignee: Hyundai Motor Company, Seoul (KR)

( * ) Notice: Subject to any disclaimer, the term of this patent is extended or adjusted under 35 U.S.C. 154(b) by 58 days.

(21) Appl. No.: 11/021,812

(22) Filed: Dec. 22, 2004

(65) Prior Publication Data

US 2006/0005368 A1 Jan. 12, 2006

(51) Int. Cl.
*B23Q 17/20* (2006.01)

(52) U.S. Cl. ............... 29/718; 29/407.05; 29/407.1; 29/464; 29/252; 29/281.1; 29/898.07

(58) Field of Classification Search ............. 29/407.01, 29/407.05, 407.1, 525, 718, 720, 888, 898.07, 29/898.09, 252, 281.1, 281.3, 281.5, 464; 384/429; 123/195 HC
See application file for complete search history.

(56) References Cited

U.S. PATENT DOCUMENTS

| | | | |
|---|---|---|---|
| 3,952,393 A | 4/1976 | van Ravenzwaay et al. .. | 29/795 |
| 4,265,495 A | 5/1981 | Backlin ..................... | 384/429 |
| 5,299,871 A | 4/1994 | Hancock .................. | 29/898.07 |
| 6,619,645 B1 | 9/2003 | Rottler et al. ............. | 29/281.1 |
| 2002/0170161 A1 | 11/2002 | Cadle et al. ............. | 29/888.09 |
| 2005/0139185 A1 | 6/2005 | Grennall et al. ........ | 456/195 R |

*Primary Examiner*—David P. Bryant
(74) *Attorney, Agent, or Firm*—Morgan Lewis & Bockius LLP

(57) ABSTRACT

An apparatus for press-fitting a bearing cap into a cylinder block includes a frame. A first cylinder is connected to the frame. A guide rod is coupled to an operating rod of the first cylinder to ascend or descend in response to an operation of the first cylinder and configured to be inserted into bolt holes respectively formed in the bearing cap and the cylinder block in response to a descending thereof. A second cylinder is connected to the frame. A pressure detection sensor detects an operating pressure generated by the second cylinder. A press pad is coupled to an operating rod of the second cylinder to ascend or descend in response to an operation of the second cylinder and configured to press the bearing cap so that the bearing cap is press-fitted into the cylinder block.

6 Claims, 3 Drawing Sheets

APPARATUS FOR PRESS-FITTING A BEARING CAP INTO A CYLINDER BLOCK

CROSS REFERENCE TO RELATED APPLICATION

This application claims priority to Korean Application No. 10-2004-0052441, filed on Jul. 6, 2004, the disclosure of which is incorporated herein by reference.

FIELD OF THE INVENTION

Generally, the present invention relates to an apparatus for press-fitting a bearing cap into a cylinder block.

BACKGROUND OF THE INVENTION

Generally, in an engine assembly line, a bearing cap is coupled to a lower portion of a cylinder block using a press-fitting apparatus. A conventional press-fitting apparatus includes a hydraulic cylinder and a press pad that is coupled to an end of an operating rod of the hydraulic cylinder. An indentation having a shape corresponding to the bearing cap is formed in the press pad.

In the conventional press-fitting apparatus, the bearing cap is inserted into the press pad, and the bearing cap is press-fitted into the cylinder block. However, in the conventional press-fitting apparatus, while press-fitting the bearing cap into the cylinder block, misalignment of the bearing cap to the cylinder block can occur. In that case, the bearing cap cannot be precisely coupled to the cylinder block.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

Embodiments of the present invention provide an apparatus for precisely and effectively press-fitting a bearing cap into a cylinder block in a state in which the bearing cap is precisely aligned with the cylinder block.

An exemplary apparatus for press-fitting a bearing cap into a cylinder block according to an embodiment of the present invention comprises: a frame; a first cylinder; a guide rod; a second cylinder; a pressure detection sensor; and a press pad. The first cylinder is connected to the frame. The guide rod is coupled to an operating rod of the first cylinder to ascend or descend in response to an operation of the first cylinder, and is configured to be inserted into bolt holes respectively formed in the bearing cap and the cylinder block in response to a descending thereof. The second cylinder is connected to the frame. The pressure detection sensor detects an operating pressure generated by the second cylinder. The press pad is coupled to an operating rod of the second cylinder to ascend or descend in response to an operation of the second cylinder and configured to press the bearing cap so that the bearing cap is press-fitted into the cylinder block.

In another embodiment of the present invention, the apparatus may further comprise a bearing cap insertion depth detection device for detecting an insertion depth of the bearing cap.

A first passage may be formed through the operating rod of the second cylinder, and the bearing cap insertion depth detection device may comprise an air pipe, an air supply element, and an air flow meter. The air pipe defines a second passage therein, and the second passage selectively communicates with the first passage in response to movements of the operating rod of the second cylinder. The air supply element supplies air into the second passage of the air pipe. The air flow meter detects an amount of air supplied to the air pipe from the air supply element.

The first cylinder may be an air cylinder, and the second cylinder may be a hydraulic cylinder.

The pressure detection sensor may include a load cell.

BRIEF DESCRIPTION OF THE DRAWINGS

The accompanying drawings illustrate exemplary embodiments of the present invention, and, together with the description, serve to explain the principles of the present invention, wherein.

DETAILED DESCRIPTION OF THE EMBODIMENTS

An embodiment of the present invention will hereinafter be described in detail with reference to the accompanying drawings.

Figure 1:
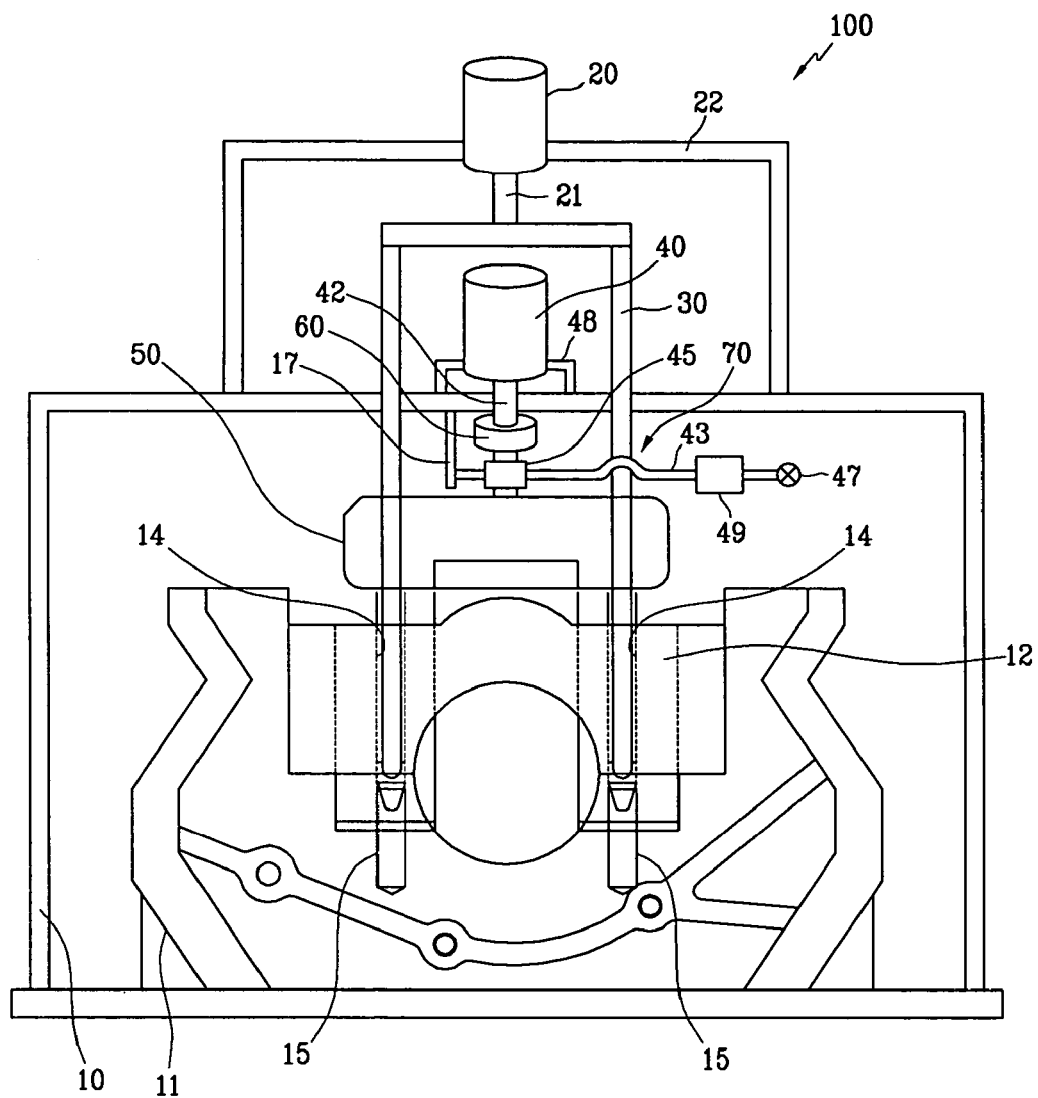
FIG. 1 is a schematic diagram showing an apparatus for press-fitting a bearing cap into a cylinder block according to an embodiment of the present invention.

As shown in FIG. 1, an apparatus 100 according to an embodiment of the present invention is an apparatus for press-fitting a bearing cap 12 into a cylinder block 11. For example, the bearing cap 12 is a device for connecting a crankshaft to the cylinder block 11. Apparatus 100 may include a frame 10, a first cylinder 20, a guide rod 30, a second cylinder 40, a pressure detection sensor 60 and a press pad 50.

The frame 10 defines a work space to which the cylinder block 11 is supplied, and the bearing cap 12 is coupled to the cylinder block 11 in this work space. The first cylinder 20 may be coupled to an upper portion of the frame 10. For example, as shown in FIG. 1, the first cylinder 20 may be connected to the frame 10 through a mounting frame 22.

An upper end of the guide rod 30 is coupled to an operating rod 21 of the first cylinder 20, so the guide rod 30 ascends or descends in response to an operation of the first cylinder 20. The guide rod 30 is configured to be inserted into bolt holes 14 and 15 that are formed respectively in the bearing cap 12 and the cylinder block 11. That is, the guide rod 30 is coupled to the operating rod 21 of the first cylinder 20 to ascend or descend in response to operations of the first cylinder 20, and a lower portion of the guide rod 30 is inserted into the bolt holes 14 and 15 when the guide rod 30 descends. The first cylinder 20 can be an air cylinder, for ease of operation.

The second cylinder 40 may be connected to the frame 10. For example, as shown in FIG. 1, the second cylinder 40 may be connected to the frame 10 through a mounting frame 48, and it may be disposed below the first cylinder 20.

The press pad 50 is coupled to an operating rod 42 of the second cylinder 40, so the press pad 50 ascends or descends in response to an operation of the second cylinder 40. The press pad 50 is configured to press the bearing cap 12 so that the bearing cap 12 is press-fitted into the cylinder block 11. That is, when the press pad 50 is lowered by the operation of the second cylinder 40, the press pad 50 presses the bearing cap 12, thereby press-fitting the bearing cap 12 into the cylinder block 11. The second cylinder 40 may be a hydraulic cylinder.

The pressure detection sensor 60 detects an operating pressure generated by the second cylinder 40, and it may be installed to the operating rod 42 of the second cylinder 40. For example, the pressure detection senor 60 may include a load cell. The pressing force acting on the bearing cap 12 can be controlled on the basis of the operating pressure detected by the pressure detection sensor 60.

Because the guide rod 30 is inserted into the bolt holes 14 and 15, which are formed in the bearing cap 12 and the cylinder block 11, by the operation of the first cylinder 20, the bearing cap 12 and the cylinder block 11 can be aligned in a precise position for coupling. By pressing the bearing cap 12 using the press pad 50 in a state in which the bearing cap 12 and the cylinder block 11 are precisely aligned, the bearing cap 12 can be inserted (i.e., press-fitted) into the cylinder block 11.

The apparatus 100 according to an embodiment of the present invention may further include a bearing cap insertion depth detection device 70 that detects a depth of an insertion of the bearing cap 12 into the cylinder block 11 through detecting a moving distance of the operating rod 42 of the second cylinder 40.

Figure 2:
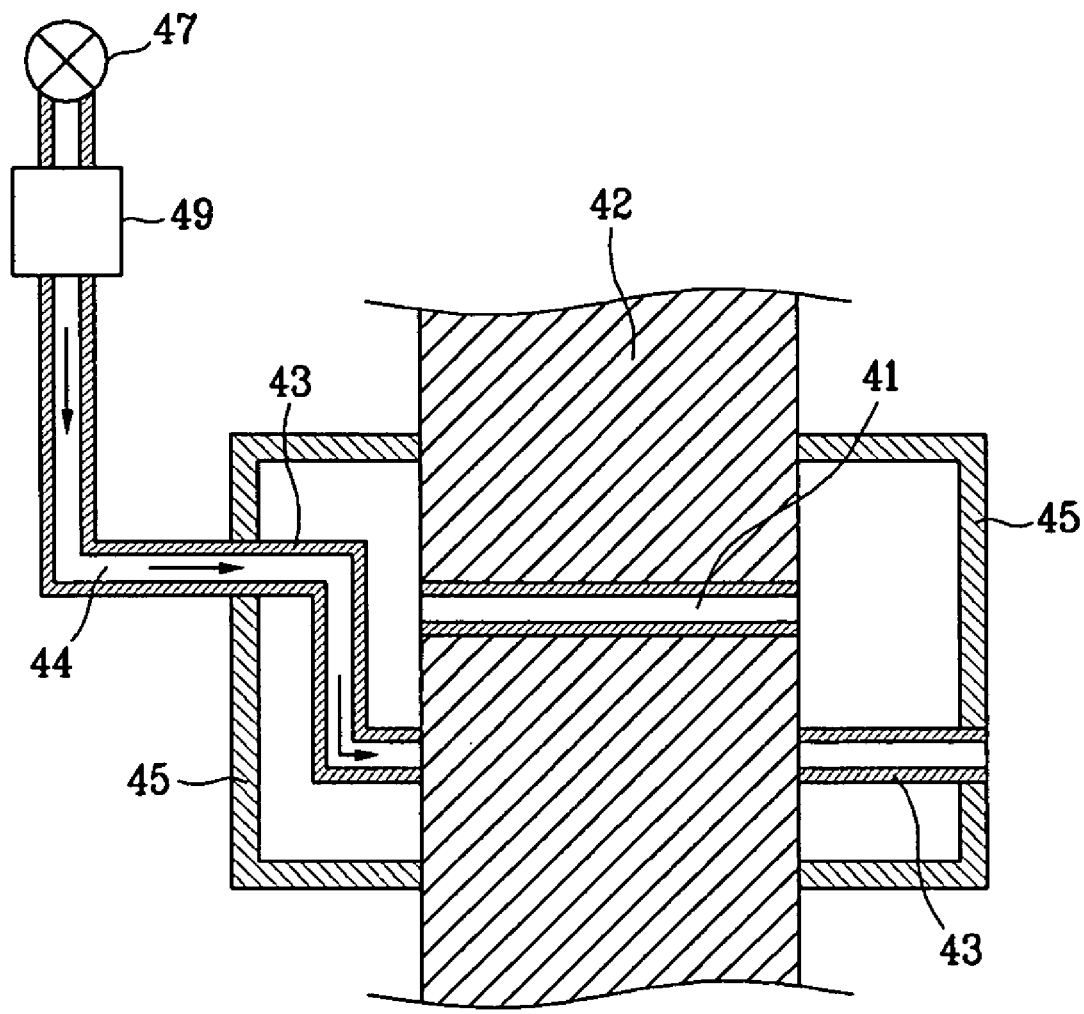
FIGS. 2 and 3 are partial cross-sectional views showing a bearing cap insertion depth detection device of an apparatus for press-fitting a bearing cap into a cylinder block according to an embodiment of the present invention.
Figure 3:
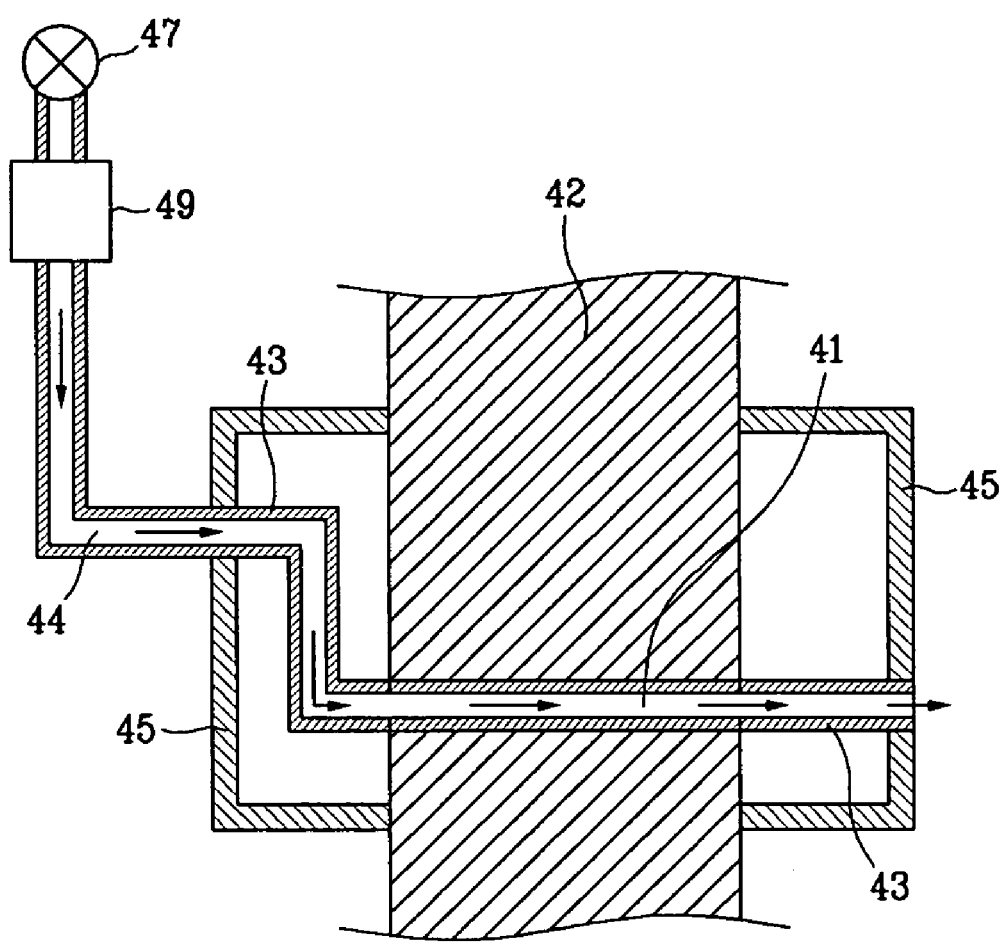

In the embodiment as shown in FIGS. 2 and 3, a first passage 41 is formed through the operating rod 42 of the second cylinder 40, i.e., the first passage 41 penetrates the operating rod 42. The bearing cap insertion depth detection device 70 includes, as shown in FIGS. 2 and 3, an air pipe 43, an air supply element 47, and an air flow meter 49. The air pipe 43 defines a second passage 44 that selectively communicates with the first passage 41 in response to the up and down movements of the operating rod 42 of the second cylinder 40. The air supply element 47 supplies air into the second passage 44 of the air pipe 43. The air flow meter detects an amount of air supplied to the second passage 44 of the air pipe 43 from the air supply element 47.

The air pipe 43 may be installed to a housing 45 that is connected to the frame 10 through a mounting frame 17. The operating rod 42 of the second cylinder 40 is vertically slidably inserted into the housing 45. The air supply element 47 is connected to one end of the air pipe 47, and supplies air into the air pipe 43 so that an air flow may be generated in the second passage 44.

When the second cylinder 40 does not operate, as shown in FIG. 2, the first passage 41 does not communicate with the second passage 44 of the air pipe 43, but the second passage 44 is closed by an outer wall of the operating rod 42 of the second cylinder 40. Accordingly, when the second cylinder 40 does not operate, air flow supplied from the air supply element 47 cannot be generated. Therefore, the air flow meter 49 detects that there is no air flow in the second passage 44. In this case, it is determined that the bearing cap 12 has not yet been inserted into the cylinder block 11.

As shown in FIG. 3, if the operating rod 42 descends according to an operation of the second cylinder 40, the first passage 41 communicates with the second passage 44 of the air pipe 43. Thus, air supplied from the air supply element 47 is exhausted to outside through the first and second passages 41 and 44. Therefore, the air flow meter 49 detects that there is an air flow in the second passage 44. In this case, it is determined that the bearing cap 12 has been completely inserted into the cylinder block 11.

Operations of the apparatus for press-fitting the bearing cap into the cylinder block according to an embodiment of the present invention will be explained hereinbelow.

At first, after the cylinder block 11 has been arrived in the work space of the frame 10, the bearing cap 12 is placed on the cylinder block 11.

Subsequently, the guide rod 30 is inserted, by an operation of the first cylinder 20, into the bolt holes 14 and 15 that are respectively formed in the bearing cap 12 and the cylinder block 11. Thus, the bearing cap 12 and the cylinder block 11 are precisely aligned.

Subsequently, the press pad 50 is lowered by an operation of the second cylinder 40, thereby pushing the bearing cap 12 toward the cylinder block 11, so that the bearing cap 12 is inserted into the cylinder block 11. At this time, an insertion state of the bearing cap 12 can be detected by the bearing cap insertion depth detection device 70.

According to embodiments of the present invention, the bearing cap and the cylinder block can be precisely aligned by the guide rod. Furthermore, an insertion state of the bearing cap can be detected by the bearing cap insertion depth detection device. Therefore, the bearing cap and the cylinder block can be precisely and effectively coupled.

While this invention has been described in connection with what is presently considered to be the most practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for press-fitting a bearing cap into a cylinder block, comprising:
   a frame;
   a first cylinder connected to the frame with an operating rod extending therefrom;
   a guide rod coupled to the operating rod to ascend or descend in response to an operation of the first cylinder and configured to be inserted into bolt holes respectively formed in the bearing cap and the cylinder block in response to a descending thereof;
   a second cylinder connected to the frame with a second operating rod extending therefrom;
   a pressure detection sensor detecting an operating pressure generated by the second cylinder; and
   a press pad coupled to the second operating rod to ascend or descend in response to an operation of the second cylinder and configured to press the bearing cap so that the bearing cap is press-fitted into the cylinder block.

2. The apparatus of claim 1, further comprising a bearing cap insertion depth detection device for detecting an insertion depth of the bearing cap.

3. The apparatus of claim 2, wherein a first passage is formed through the second operating rod of the second cylinder, and wherein the bearing cap insertion depth detection device comprises:
   an air pipe defining a second passage therein, wherein the second passage selectively communicates with the first passage in response to movements of the second operating rod;
   an air supply element supplying air into the second passage of the air pipe; and
   an air flow meter detecting an amount of air supplied to the air pipe from the air supply element.

4. The apparatus of claim 1, wherein the first cylinder is an air cylinder.

5. The apparatus of claim 1, wherein the second cylinder is a hydraulic cylinder.

6. The apparatus of claim 1, wherein the pressure detection sensor comprises a load cell.

* * * * *